US010296103B2

(12) United States Patent
Carreon et al.

(10) Patent No.: US 10,296,103 B2
(45) Date of Patent: May 21, 2019

(54) WIRELESS KEYBOARD WITH A PIVOTAL SLOT

(71) Applicant: ZAGG Intellectual Property Holding Co., Inc., Midvale, UT (US)

(72) Inventors: Manuel Carreon, Lehi, UT (US); Kelly A. Harward, Layton, UT (US); Paul Faerber, Pleasant Grove, UT (US)

(73) Assignee: ZAGG Intellectual Property Holding Co., Inc., Midvale, UT (US)

(*) Notice: Subject to any disclaimer, the term of this patent is extended or adjusted under 35 U.S.C. 154(b) by 408 days.

(21) Appl. No.: 15/069,609

(22) Filed: Mar. 14, 2016

(65) Prior Publication Data

US 2016/0274675 A1 Sep. 22, 2016

Related U.S. Application Data

(60) Provisional application No. 62/134,469, filed on Mar. 17, 2015.

(51) Int. Cl.
G06F 3/00 (2006.01)
G06F 3/023 (2006.01)
G06F 3/02 (2006.01)
G06F 1/16 (2006.01)

(52) U.S. Cl.
CPC .......... G06F 3/0231 (2013.01); G06F 1/1601 (2013.01); G06F 1/162 (2013.01); G06F 1/1616 (2013.01); G06F 1/1624 (2013.01); G06F 1/1632 (2013.01); G06F 1/1654 (2013.01); G06F 3/021 (2013.01); G06F 3/0227 (2013.01)

(58) Field of Classification Search
CPC ...... G06F 1/162; G06F 1/1624; G06F 1/1601; G06F 1/1616; G06F 1/1632; G06F 1/1654; G06F 1/1677; G06F 1/1679; G06F 1/1681; G06F 3/021; G06F 3/0227; G06F 3/0231
See application file for complete search history.

(56) References Cited

U.S. PATENT DOCUMENTS

| 6,151,012 | A  | * | 11/2000 | Bullister | G06F 1/1616 345/168 |
| 6,937,468 | B2 | * | 8/2005 | Lin | G06F 1/1632 361/679.41 |
| 8,267,368 | B2 | * | 9/2012 | Torii | F16M 11/10 248/188.8 |
| 8,363,014 | B2 | * | 1/2013 | Leung | G06F 3/0231 341/21 |
| 8,599,542 | B1 | * | 12/2013 | Healey | G06F 1/1626 345/168 |
| 8,817,457 | B1 | * | 8/2014 | Colby | G06F 1/1669 206/320 |
| 8,917,499 | B1 |   | 12/2014 | Read | |
| 9,063,698 | B2 | * | 6/2015 | Chang | G06F 1/1637 |

(Continued)

Primary Examiner — Matthew G Marini
Assistant Examiner — Marissa Ferguson-Samreth
(74) Attorney, Agent, or Firm — Thorpe, North & Western, LLP

(57) ABSTRACT

A wireless keyboard wirelessly connects to a desktop computer, a tablet and/or a cellular phone, and carries the tablet and/or cellular phone in a dock. The dock has a slot formed in an upper wall of a keyboard panel. A bar with a channel is pivotally carried by the keyboard panel and pivots in the slot. One or more ribs and/or notches on an exterior of the bar are engaged by a pawl in the keyboard panel to releasably maintain a position of the bar.

20 Claims, 4 Drawing Sheets

(56) References Cited

U.S. PATENT DOCUMENTS

| | | | | |
|---|---|---|---|---|
| 9,122,448 B2* | 9/2015 | Gao | ................ | G06F 1/1632 |
| 9,167,064 B2* | 10/2015 | Elter | ................ | H04M 1/72 |
| 9,170,613 B2* | 10/2015 | Lan | ................ | G06F 1/1681 |
| 9,507,384 B2* | 11/2016 | Liang | ................ | G06F 1/1656 |
| 2004/0111837 A1* | 6/2004 | Lallemant | ................ | G06F 1/1616 |
| | | | | 16/297 |
| 2012/0099267 A1* | 4/2012 | Ahn | ................ | F16M 11/10 |
| | | | | 361/679.27 |
| 2012/0243149 A1* | 9/2012 | Gartrell | ................ | G06F 1/1616 |
| | | | | 361/679.01 |
| 2012/0327580 A1* | 12/2012 | Gengler | ................ | G06F 1/1626 |
| | | | | 361/679.09 |
| 2012/0327594 A1* | 12/2012 | Gengler | ................ | G06F 1/1632 |
| | | | | 361/679.56 |
| 2013/0170126 A1* | 7/2013 | Lee | ................ | G06F 1/1654 |
| | | | | 361/679.17 |
| 2013/0279096 A1* | 10/2013 | Gengler | ................ | H05K 7/00 |
| | | | | 361/679.01 |
| 2014/0334086 A1* | 11/2014 | Chou | ................ | G06F 1/1679 |
| | | | | 361/679.17 |
| 2015/0138721 A1 | 5/2015 | Liang | | |
| 2015/0378399 A1* | 12/2015 | Grinstead | ................ | G06F 1/1681 |
| | | | | 361/679.09 |
| 2016/0048173 A1* | 2/2016 | Lyles | ................ | G06F 1/1681 |
| | | | | 361/679.17 |

\* cited by examiner

WIRELESS KEYBOARD WITH A PIVOTAL SLOT

PRIORITY CLAIM

Priority is claimed to U.S. Provisional Patent Application Ser. No. 62/134,469, filed Mar. 17, 2015, which is hereby incorporated herein by reference in its entirety.

BACKGROUND

Field of the Invention

The present invention relates generally to wireless keyboards.

Related Art

Tablet computers, or tablets, are increasing in popularity. Wireless keyboards are a common accessory to such tablets. Such wireless keyboards can connect wirelessly to, and communicate with, such tablets, such as with a Bluetooth connection.

SUMMARY OF THE INVENTION

It has been recognized that it would be advantageous to develop a wireless keyboard capable of being used with more than one computing device. In addition, it has been recognized that it would be advantageous to develop a wireless keyboard capable of carrying one or more computing device. Furthermore, it has been recognized that it would be advantageous to develop a wireless keyboard capable to selectively orienting the one or more computing device thereon.

The invention provides a wireless keyboard device configured to carry and wirelessly connect to a computing device including a tablet, or a cellular phone, or both. The wireless keyboard device comprises a keyboard panel with an upper wall and carrying a keyboard with a matrix of alphanumeric keys. A slot is formed in the upper wall of the keyboard panel. The slot has a longitudinal length extending substantially a width of the keyboard panel and contained within the width of the keyboard panel. The slot has opposite ends closed by the keyboard panel and the upper wall. The slot is fixed with respect to the keyboard panel. An elongated channel is pivotally carried by the keyboard panel and is pivotal within the slot with respect to the slot and the keyboard panel. The elongated channel is aligned with the slot and has a length extending substantially the length of the slot. The elongated channel is configured to receive an edge of the tablet, or the cellular phone, or both.

In addition, the invention provides a wireless keyboard device configured to carry and wirelessly connect to a computing device including a tablet, or a cellular phone, or both. The wireless keyboard device comprises a keyboard panel carrying a keyboard with a matrix of alphanumeric keys. An elongated bar IS pivotally carried by the keyboard panel. The elongated bar is pivotal with respect the keyboard panel. An elongated channel is formed in the elongated bar. The elongated channel is configured to receive an edge of the tablet, or the cellular phone, or both. At least one rib or notch is on an exterior of the bar and is aligned with a longitudinal length of the bar. A pawl is disposed in the keyboard panel and is engageable with the at least one rib or notch of the bar to releasably maintain a position of the bar with respect to the keyboard panel. The pawl is movable with respect to the bar and the at least one rib or notch of the bar.

Furthermore, the invention provides a wireless keyboard device configured to carry and wirelessly connect to a computing device including a tablet, or a cellular phone, or both. The wireless keyboard device comprises a keyboard panel with an upper wall and carrying a keyboard with a matrix of alphanumeric keys. A slot is formed in the upper wall of the keyboard panel. The slot has a longitudinal length extending substantially a width of the keyboard panel and contained within the width of the keyboard panel. The slot has opposite ends closed by the keyboard panel and the upper wall. The slot is fixed with respect to the keyboard panel. An elongated channel is pivotally carried by the keyboard panel. The elongated channel is pivotal with respect the slot and the keyboard panel. The elongated channel is aligned with the slot and has a length extending substantially the length of the slot. The elongated channel is configured to receive an edge of the tablet, or the cellular phone, or both. At least one rib or notch is on an exterior of the channel and is aligned with the length of the channel. A pawl is disposed in the keyboard panel and engageable with the at least one rib or notch of the channel to releasably maintain a position of the channel with respect to the slot and the keyboard panel. The pawl is movable with respect to the channel and the at least one rib or notch of the channel.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
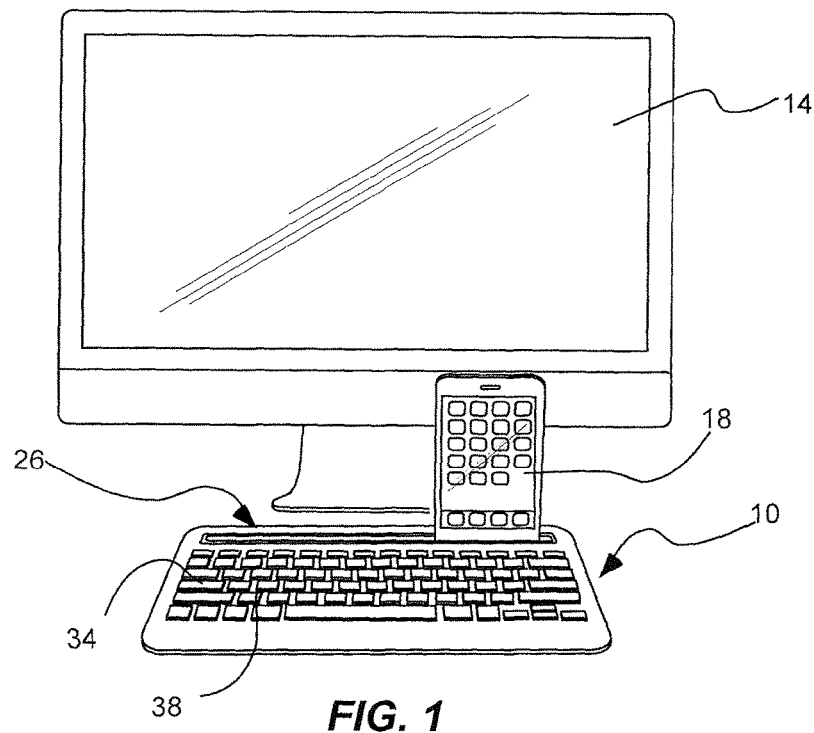
FIG. 1 is a front perspective view of a wireless keyboard in accordance with an embodiment of the present invention, shown with a pair of computing devices, namely a cellular phone and a desktop computer.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "computing device" is used herein to refer to a computer, desktop computer, laptop computer, tablet or tablet computer, phablet, or cellular or cell phone with a display screen. The display screen can be a touch screen that can receive input by touch such as finger swipes, and/or can have a virtual keyboard. The computing device can have memory and a processor with software running thereon. The computing device can have cellular, WiFi and/or Bluetooth connectivity. Thus, the computing device can provide internet browsing, game playing, movie and picture display, e-book display, etc. The display screen can display content or alphanumeric characters typed on the keyboard.

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, etc. The screen can be a touch screen that can receive input by touch, such as finger swipes, and/or can have a virtual keyboard. The tablet can be wide (or broad) and thin. For example, the screen can have a diagonal length greater than 7 inches, and a thickness less than a ¼-½ inch. The tablet can have a battery and memory and a processor with software running thereon. The tablet can have WiFi and Bluetooth connectivity. Thus, the tablet can provide internet browsing, game playing, movie and picture display, e-book display, etc. In addition, the tablet can include a digital camera. Furthermore, the terms tablet computer and tablet are used broadly herein to refer to cellular or cell phones (or smart phones) and phablets, which also provide similar computing capabilities, battery power, memory, processor, software, WiFi and Bluetooth connectivity, touch screen display, digital camera, etc. Such phones or phablets can have a screen with a diagonal length less than 7 inches and a thickness less than 10 mm. Examples of cell phones and phablets include the Apple iPhone, the Samsung Galaxy S phone series, the Samsung Note 3 phablet, HTC One Max, Nokia Lumina 1520, etc.

In addition, such tablet computers can have a rectangular shape with a longer height and a narrower width (in a portrait orientation), and with a landscape orientation commonly utilized with keyboards in which the width is vertical and the height is horizontal. Furthermore, such tablets can have different widths between brands and/or models.

The term "keyboard" refers to an array or matrix of alphanumeric (both alphabetical and/or numeric) or character keys, modifier keys for altering the functions of other keys, navigation keys for moving the text cursor on a display, function keys and/or system command keys. The keyboard can have a keyboard layout with keys arranged in an acceptable format or standard, such as the QWERTY layout. The keyboard layout can include three rows of characters or letters, a row of numbers above the characters, and one or two rows of other keys, such as a space bar, modifier keys, function keys, navigations keys, etc., for a total of five or six rows. Most of the keys can be square or rectilinear buttons of the same size and shape. In addition, the keys can be buttons capable of registering contact, pressure or force from a user's fingers. The keys or buttons can use any appropriate switch technology, including for example, membrane, dome-switch, scissor-switch, capacitive, mechanical-switch, buckle spring, Hall effect, laser, optical, etc. The keys, buttons and/or switches can provide a feedback response and can have a travel distance. Furthermore, the keyboard can be part of, or can itself form, a keyboard panel. In use, the keyboard can be physically, but not electrically coupled to the computing device; or can be remote from the computing device. In addition, the keyboard can include battery power, a wireless transmitter, receiver, or transceiver, a memory, a processor, and software. In one aspect, the keyboard can include WiFi and Bluetooth connectivity. In another aspect, the keyboard can include a physical and electrical connection.

Description

As illustrated in FIGS. 1-5, a wireless keyboard device 10 in an example implementation in accordance with the invention is shown to wirelessly connect to one or more computing devices, and to allow typing or keyboard data entry on the computing devices. The keyboard 10 can wirelessly connect to different computing devices, such as a desktop computer 14, a cellular phone 18, and a tablet computer 22. The keyboard can wirelessly connect to a single or multiple computing device. In addition, the keyboard can toggle between wireless connections with different computing devices. Furthermore, the keyboard can receive a tablet or cellular phone in a pivotal dock 26 to allow the angle of the tablet or cellular phone to be adjusted with respect to the keyboard to suit the user and facilitate viewing while using the keyboard. The pivotal dock 26 can be sized to receive two or more tablets or cellular phones simultaneously. Thus, the keyboard 10 can receive at least two tablets or cellular phones in the pivotal dock, and toggle between wireless connections between the tablets or cellular phones, and the desktop computer.

Figure 2:
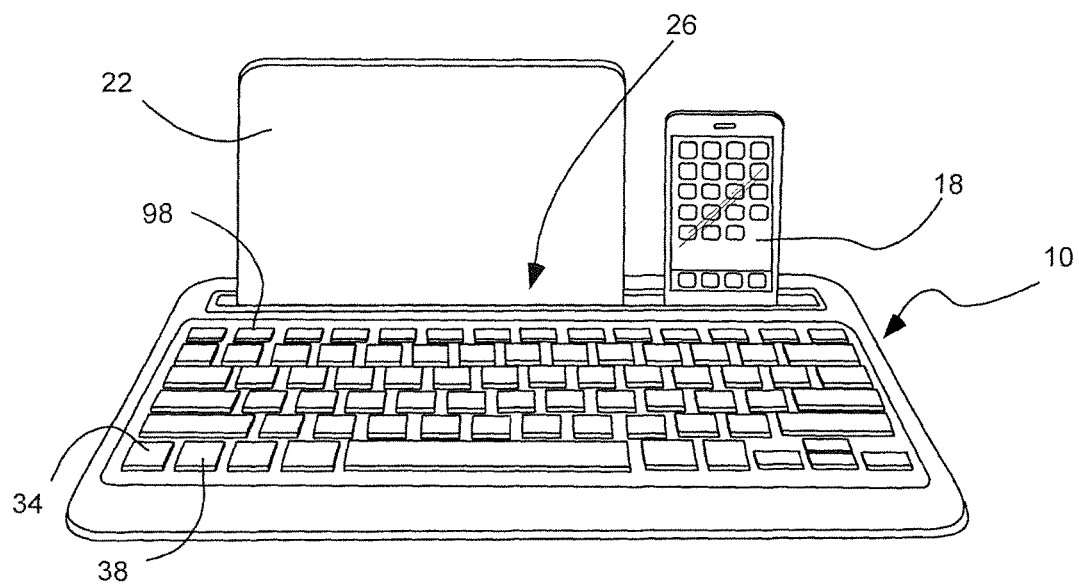
FIG. 2 is a front perspective view of the wireless keyboard of FIG. 1, shown with another pair of computing devices, namely the cellular phone and a tablet.

The keyboard 10 can be located in front of a desktop computer 14, or monitor thereof, as shown in FIG. 1. The keyboard can wirelessly connect to the desktop computer. The keyboard can also receive and carry a cellular phone 18. The keyboard can also wirelessly connect to the cellular phone, and can toggle between the desktop computer and the cellular phone. In addition, the keyboard can also receive and carry a tablet 22, as shown in FIG. 2. The keyboard can also wirelessly connect to the tablet, and can toggle between the desktop computer and the cellular phone and the tablet. Furthermore, the keyboard can be used alone with the cellular phone (FIG. 3), or with a pair of devices, such as the cellular phone and the tablet (FIG. 2), without the desktop computer.

The wireless keyboard 10 can comprise a keyboard panel or base 30 that carries a keyboard 34 with a matrix of alphanumeric keys 38. The wireless keyboard 10 and/or the keyboard panel 30 can also have a housing 42 with an interior 46 defined by a perimeter wall, including an upper wall 50. The alphanumeric keys 38 can be disposed on, or can extend through, the upper wall 50. In addition, the keyboard panel 30 can have a keyboard section with the keyboard 34 and/or alphanumeric keys located in a forward portion of the panel, and a dock section with the dock 26 located in a rearward portion. Thus, the keyboard 10 and/or the keyboard panel 30 and/or the dock 26 can carry one or more computing device (such as the cellular phone 18 and/or the tablet 22) in a position to be viewed behind the keyboard 34 while typing on the keyboard 34. The upper wall 50, or the dock section thereof, can form the uppermost surface of the keyboard panel. The keyboard panel can have a width Wp.

In one aspect, the wireless keyboard 10, keyboard panel 30 and/or dock 26 comprises a slot 54 formed in the upper wall 54 of the keyboard panel 30. The slot 54 can extend through the upper wall 54 and into the interior 46 of the panel or housing. The slot 54 can be elongated along a longitudinal axis and can have a longitudinal length Ls. The slot 54 can be oriented laterally, or side-to-side, or with the length or longitudinal axis oriented laterally or side-to-side. The longitudinal length or longitudinal axis of the slot 54 can extend substantially, or nearly, the width Wp of the keyboard panel 30. The keyboard panel 30 or width Wp thereof, however, can contain the slot 54 therein (or the slot 30 can be contained within the width Wp of the keyboard panel). Thus, opposite ends of the slot 54 can be closed by the keyboard panel 30 and/or and the upper wall 50 thereof. Enclosing the slot, or opposite ends thereof, within the upper wall can resist the computing devices (cellular phone and/or tablet) from inadvertently sliding out of the ends of the dock 26. In addition, the slot 30 can be fixed with respect to the keyboard panel 30 and the keyboard wall 50.

Figure 5:
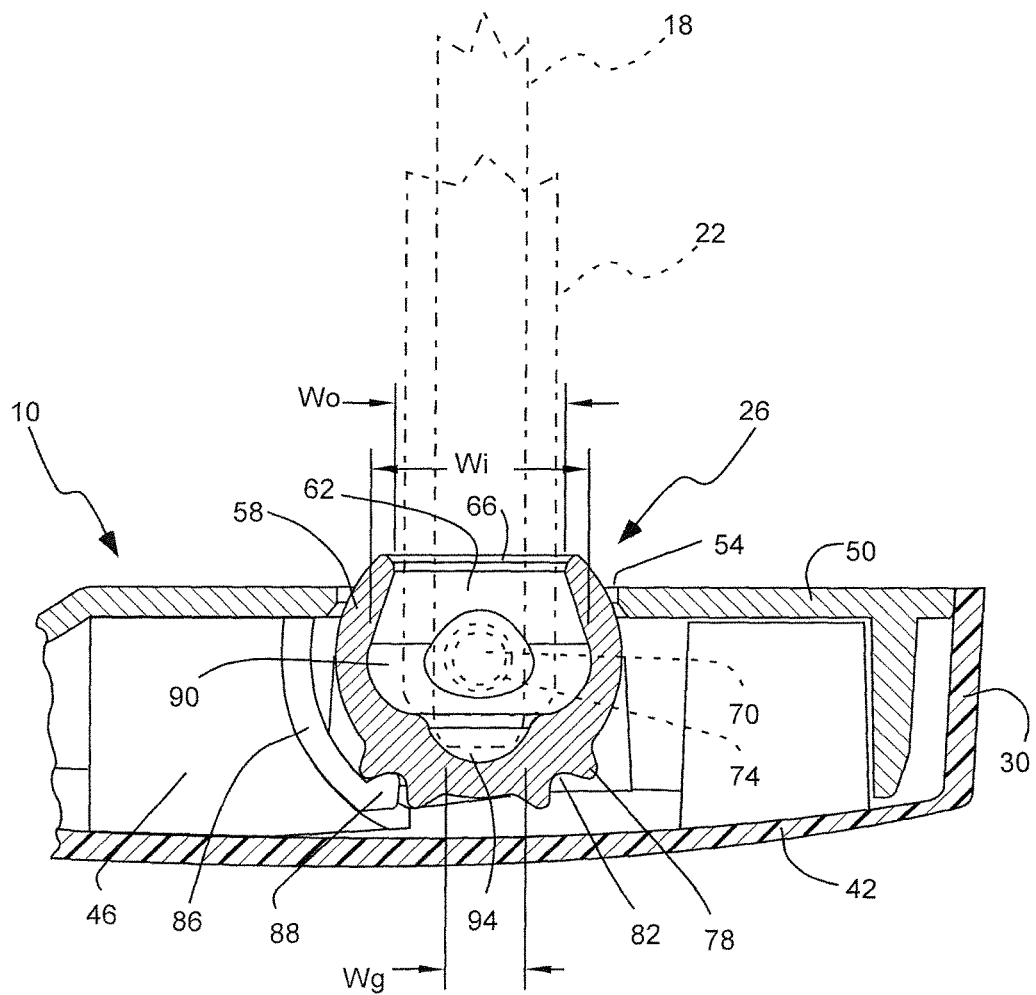
FIG. 5 is a partial cross-sectional side view of the wireless keyboard of FIG. 1.

In addition, the wireless keyboard 10, keyboard panel 30 and/or dock 26 can comprise an elongated bar 58 pivotally carried by the keyboard panel 30, and pivotal within the slot 54 (and interior 46 of the panel) with respect to the slot and the keyboard panel. The bar 58 can be elongated along a longitudinal axis and can have a length Lb extending substantially or nearly a length Ls of the slot 54, and can substantially file the length of the slot. Thus, the bar or perimeter thereof can be contained or enclosed by the slot, and thus the panel or upper wall thereof. Thus, the bar can be shorter than a width of the panel and shorter than a length of the slot. In one aspect, the bar, or a portion thereof, can be pivotally disposed in the slot, and can extend into or through the slot, as shown in FIG. 5. The bar can be oriented or aligned with the slot.

Figure 3:
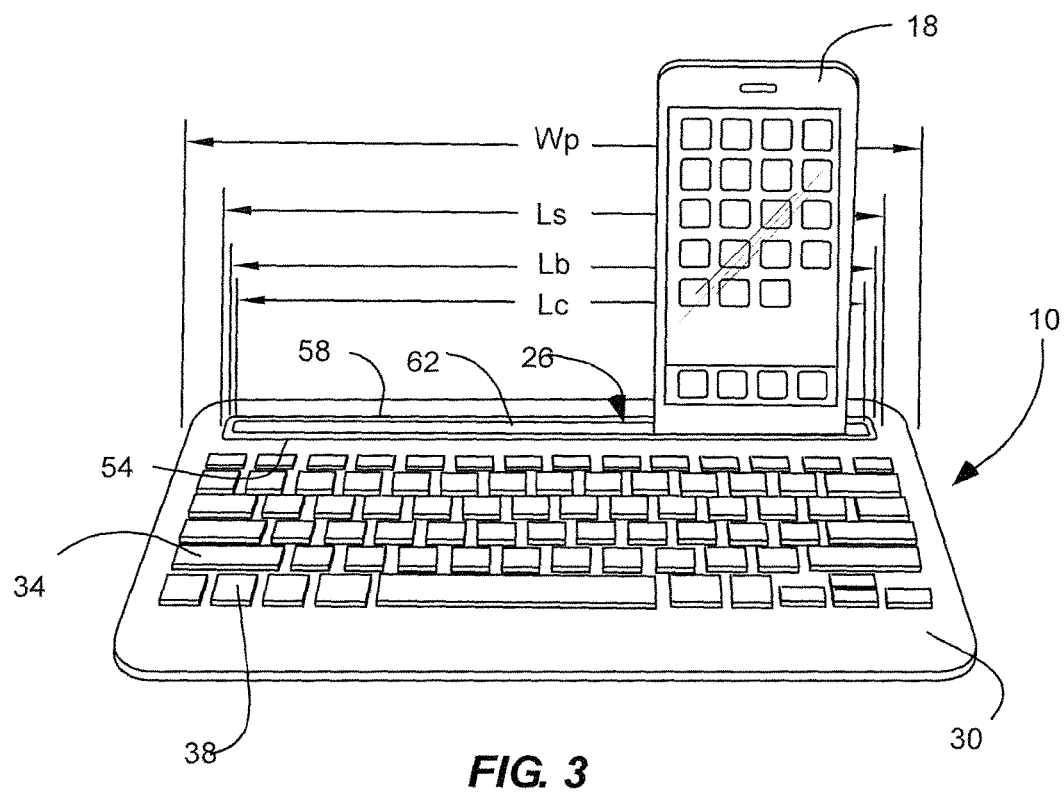
FIG. 3 is a front perspective view of the wireless keyboard of FIG. 1, shown with a computing device, namely the cellular phone.
Figure 4:
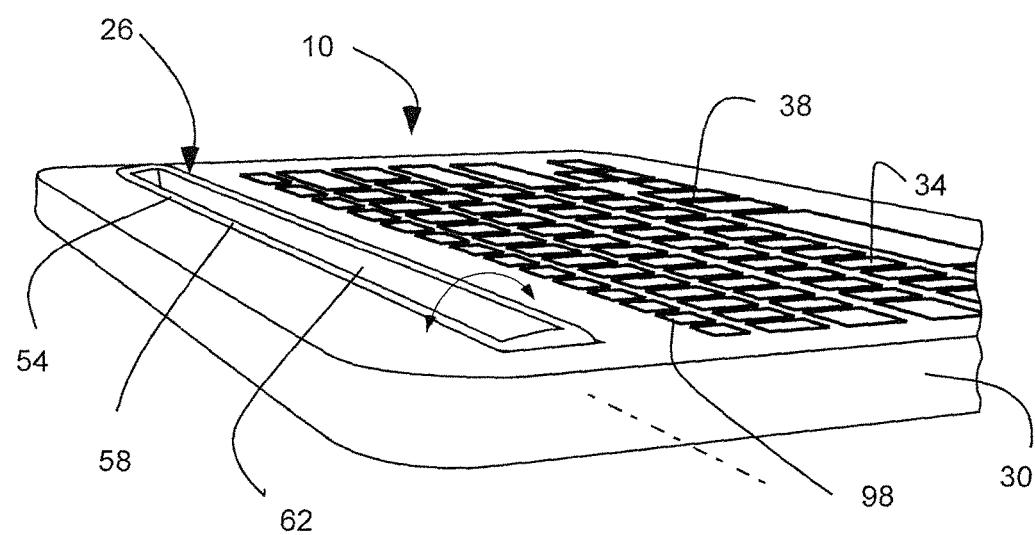
FIG. 4 is a partial rear perspective view of the wireless keyboard of FIG. 1.

An elongated channel 62 can be formed in the elongated bar 58. The channel 62 can receive an edge of the tablet 22, or the cellular phone 18, or both, as shown in FIGS. 1-3. The elongated channel 62 can be pivotally carried by the keyboard panel 30, and the elongated channel 62 can be pivotal with respect the slot 54 and the keyboard panel 30. Thus, the tablet 22 and/or cellular phone 18 can be pivotally carried by the panel 30 and/or keyboard, and pivotal with respect to the panel and/or keyboard. The channel can be elongated along a longitudinal axis and can have a length Lc extending substantially or nearly the length Lb of the bar, and thus substantially or nearly the length Ls of the slot. The channel can be oriented or aligned with the slot. The length Lc of the channel (and the length Lb of the bar 58 and the length Ls of the slot 54 and the width Wp of the panel 30) can be sized to receive at least one computing device in one aspect, or at least two computing devices in another aspect. Thus, multiple and/or different computing devices can be carried by the keyboard and/or dock. As described above with respect to the bar, the elongated channel 62 can extend from the keyboard panel 30 and through the slot 54 and upper wall 50. The channel 62 has an opening 66 thereto disposed above the slot 54 and the upper wall 50, and thus outside of the keyboard panel 30. Thus, the opening 66, channel 62 and/or bar 58 provides a visual cue to locate the edge of the computing device therein. In one aspect, the channel 62 can have opposite ends enclosed by the bar 58, as shown in 2-4. Thus, the enclosed opposite ends can resist the computing devices from interfering with the slot or panel during pivotal motion. The bar can be wider than the slot to reduce any confusing gap between the upper wall or lip of the slot and the opening of the channel in the bar.

The bar 58 and/or channel 62 can have a pair of axles 70, each disposed on a different end of the bar or channel, about which the bar pivots with respect to the keyboard panel. The axles define a pivot axis about which the bar and/or channel pivots. The axles can be retained in bores or holes 74 in the perimeter wall of the housing of the panel. The pivot axis can be disposed below the slot and the upper wall, and within the interior of the keyboard panel.

As described above, the bar 58 and/or the channel 62 can pivot in the panel 30 and/or slot 54 to adjust the viewing angle of the computing device, or tablet and/or cellular phone. The keyboard panel and/or dock can further comprise a mechanism for adjusting and holding a rotatable position of the bar and channel, and thus the tablet and/or cellular phone, with respect to the keyboard panel. The bar 58 and/or the channel 62 can have at least one rib 78 or notch 82 on an exterior of the bar and/or the channel, and aligned with the length of the bar and/or the channel. In one aspect, the bar 58 can have a plurality of ribs 78 spaced-apart with respect to one another around a circumference of the bar, and defining a plurality of notches 82 therebetween, as shown in FIG. 5.

A pawl 86 can be disposed in the keyboard panel 30, and engageable with the at least one rib 78 and/or notch 82 of the bar or channel, to releasably maintain a position of the bar or channel with respect to the slot and the keyboard panel. The pawl can have or can be a tooth or protrusion 88 engaging the rib or notch. The pawl can have or can be a finger with a proximal end fixed to the housing or panel, and a distal free end with the tooth or protrusion. The pawl or finger can be formed of a flexible or resilient material so that the pawl or finger is flexible to deflect as the bar or channel pivots, displacing the tooth or protrusion, and resilient or elastic to return to its original position. The pawl can move or pivot with respect to the bar and/or channel and the at least one rib or notch of the channel as the bar pivots. The pawl or finger, or elastic material thereof, can form a bias member to bias the pawl or tooth or protrusion into engagement with the at least one rib and/or notch of the bar or channel. In one aspect, the pawl can be flexible and resilient, or elastic, to form or be the bias member, to resist movement of the at least one rib or notch of the bar or channel with respect to the pawl, and thus pivotal movement of the bar or channel with respect to the slot. In another aspect, dock can comprise a separate bias member engaging the pawl, and biasing the pawl into engagement with the bar, or rib or notch. In one aspect, the pawl 86 can have a tooth or protrusion 88 that engages one of a plurality of notches 82 on the bar 62. The notches 82 can be spaces apart around a circumference of the bar 62, and can be located with respect to the channel 62 and opening 66 thereof to define the angle or orientation of the computing device. In use, a user can place an edge of one or more computing devices (tablet 22 or cellular phone 18) through the opening 66 and into the channel 62; and the user can push or pull on the computing device to pivot the computing device, and the bar, with respect to the keyboard. As the bar pivots under the force applied to the computing device, the notch 82 and/or ribs 78 can displace the pawl 86 against the force of the biasing member or elasticity of the pawl. When the computing device is positioned as desired, the biasing member or elasticity of the pawl displaces the pawl, or tooth or protrusion, into the notch to maintain the position of the bar, and thus the computing devices, with respect to the keyboard.

The channel 62 can be sized and/or shaped to receive different thicknesses and/or shapes of edges of computing devices. In one aspect, the channel 62 can have an interior hollow 90 larger than the opening 66 to the channel. The opening 66 of the channel 62 can have an opening width Wo (perpendicular to the longitudinal axis and length of the channel) smaller than an interior width Wi (perpendicular to the longitudinal axis and length of the channel) of the interior hollow 90 of the channel (so that with interior width Wi of the channel is larger than the opening width Wo). In addition, the channel 62 can have a groove 94 formed in a bottom of the channel. The groove can have a groove width Wg less than the interior width Wi. Thus, a wider edge can be received in the interior hollow 90 of the channel, while a narrower edge can be received in the groove 94.

The wireless keyboard 10 can comprise a plurality (at least two or three) buttons 98 disposed on the keyboard 34 and associated with different wireless connections between a plurality (at least two or three) different the computing devices. The keyboard can be configured to toggle between a plurality of wireless connections with a plurality of computing devices. The keyboard can have a switching mechanism to switch between typing on different computing devices. In one aspect, at least two buttons can be disposed on the keyboard panel and associated with different wireless connections between at least two different computing devices. In another aspect, at least three buttons can be disposed on the keyboard panel and associated with different wireless connections between at least three different computing devices, including a desktop computer, a tablet computer, and a cellular phone. Therefore, the keyboard can have a rotatable slot configured to hold a smart phone or tablet computer. The keyboard can also have a switching mechanism, which would allow the user to switch between typing on a smart phone, tablet or regular computer.

Figure 6:
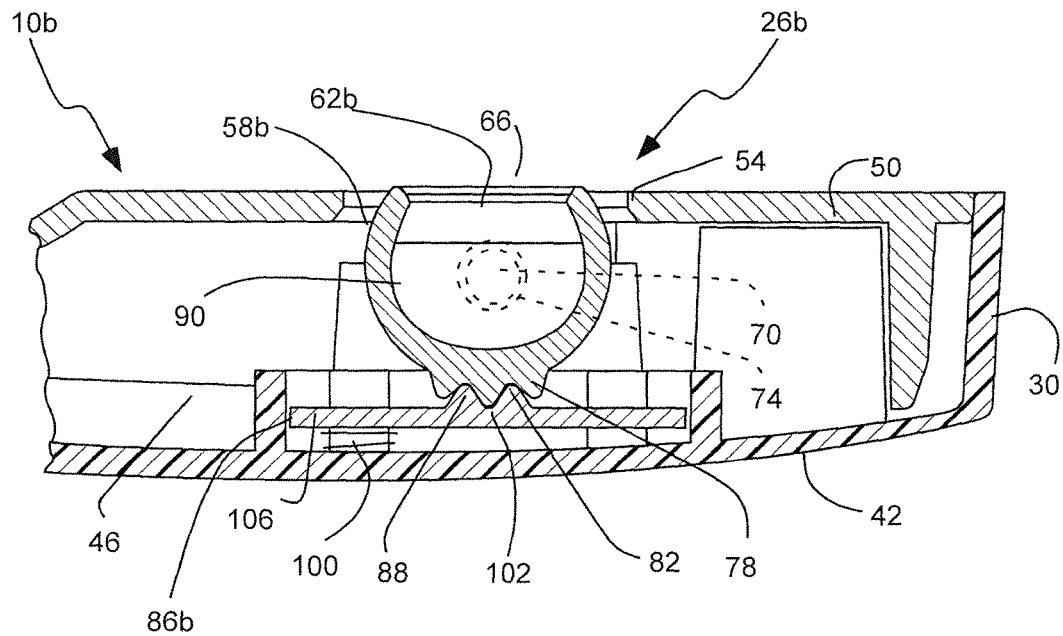
FIG. 6 is a partial cross-sectional side view of another wireless keyboard in accordance with another embodiment of the present invention.

Referring to FIG. 6, another wireless keyboard 10*b* is shown that is similar in many respects to that described above, and which description is hereby incorporated herein by reference. The wireless keyboard 10*b* can comprise a keyboard panel or base 30*b* carrying a bar 58*b* with a channel 62*b* therein pivotal in the slot 54 in the upper wall 50. A pawl 86*b* can be disposed in the keyboard panel 30*b*, and engageable with the at least one rib 78 and/or notch 82 of the bar or channel to releasably maintain a position of the bar or channel with respect to the slot and the keyboard panel. In one aspect, the pawl 86*b* can be movable into engagement with the ribs or notches, and biased into engagement by a bias member, namely one or more springs 100. Thus, the bias member can comprise at least one spring biasing the spar towards the bar. In one aspect, the pawl 86*b* can comprise a notch 102 formed between a pair of teeth or protrusions 88 and carried by a spar 106. The notch 102 can removable receive at least one of the plurality of ribs 78 of the bar therein. Thus, the rib 78 can be held in the notch 102 to hold the position of the bar and the channel, and thus the tablet and/or cellular phone therein. As a force is exerted upon the tablet and/or cellular phone, the rib can displace out of the notch, and the notch can displace away from the rib and the bar to allow the rib to displace. The spar can travel along a pair of posts.

Figure 7:
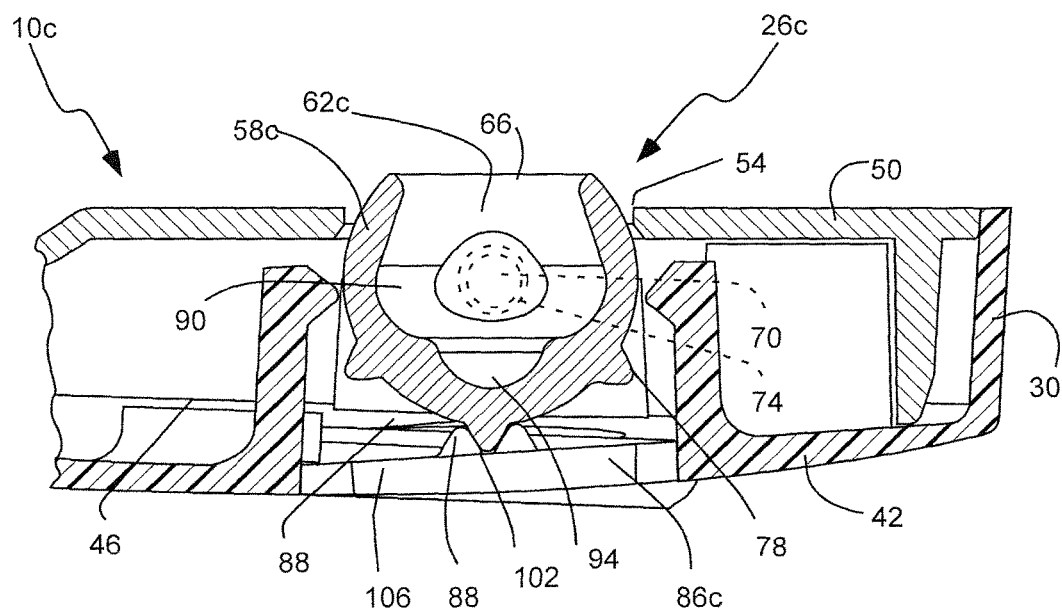
FIG. 7 is a partial cross-sectional side view of another wireless keyboard in accordance with another embodiment of the present invention.

Referring to FIG. 7, another wireless keyboard 10*c* is shown that is similar in many respects to those described above, and which descriptions are hereby incorporated herein by reference. The wireless keyboard 10*c* can comprise a keyboard panel or base 30*c* carrying a bar 58*c* with a channel 62*c* therein pivotal in the slot 54 in the upper wall 50. A pawl 86*c* can be disposed in the keyboard panel 30*c*, and engageable with the at least one rib 78 and/or notch 82 of the bar or channel to releasably maintain a position of the bar or channel with respect to the slot and the keyboard panel. In one aspect, the pawl 86*c* can comprise a notch 102 formed between a pair of teeth or protrusions 88 and carried by a spar 106. In another aspect, the spar 106 can be a bias member, and can be formed of a flexible and resilient material so that it is elastic. The notch 102 can removable receive at least one of the plurality of ribs 78. Thus, the rib can be held in the notch to hold position of the bar and the channel, and thus the tablet and/or cellular phone therein. As a force is exerted upon the tablet and/or cellular phone, the protrusion can displace out of the notch, and the notch and spar can displace away from the ribs and the bar to allow the ribs/bar to displace.

Various aspects of a wireless keyboard are described in U.S. Pat. No. 8,917,499, which is hereby incorporated herein by reference in its entirety. In addition, the wireless keyboard can comprise a battery power source, a wireless transceiver, a digital memory device, and one or more processors. The wireless transceiver can send and/or receive keystrokes from the keyboard to the computing device. The keys can be connected to the processor and the keystrokes can be stores in the digital memory device. The power source can power the transceiver and processor.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A wireless keyboard device configured to carry and wirelessly connect to a computing device including a tablet, or a cellular phone, or both, the wireless keyboard device comprising:
   a) a keyboard panel with an upper wall and carrying a keyboard with a matrix of alphanumeric keys;
   b) a slot formed in and contained within the upper wall of the keyboard panel, the slot having a longitudinal length extending substantially a width of the keyboard panel, the slot having opposite ends closed by the keyboard panel and the upper wall, the slot being fixed with respect to the keyboard panel;
   c) an elongated bar pivotally carried by the keyboard panel and pivotal within the slot with respect to the slot and the keyboard panel, and having a length extending substantially a length the slot;
   d) a pair of axles, each disposed on a different end of the bar and aligned with a longitudinal axis of the bar, and aligned to define a pivot axis about which the bar pivots with respect to the keyboard panel; and
   e) an elongated channel formed in the elongated bar and pivotal within the slot with respect to the slot and the keyboard panel, the elongated channel being aligned with the slot and having a length extending substantially the length of the slot, the elongated channel configured to receive an edge of the tablet, or the cellular phone, or both.

2. The wireless keyboard device in accordance with claim 1, wherein the elongated channel extends from the keyboard panel through the slot; and wherein the elongated channel has an opening thereto disposed above the slot and outside of the keyboard panel.

3. The wireless keyboard device in accordance with claim 1, wherein the elongated channel has a pivot axis extending through the channel and aligned with a longitudinal axis of the channel.

4. The wireless keyboard device in accordance with claim 1, wherein the channel has an opening thereto with an opening width and an interior hollow with an interior width larger than the opening width.

5. The wireless keyboard device in accordance with claim 1, wherein the channel has an interior hollow with an interior width; and further comprising a groove formed in a bottom of the channel having a groove width less than the interior width.

6. The wireless keyboard device in accordance with claim 1, further comprising:
   a) at least one rib or notch on an exterior of the bar and aligned with the length of the bar; and b) a pawl disposed in the keyboard panel and engageable with the at least one rib or notch of the bar to releasably maintain a position of the bar with respect to the slot and the keyboard panel, the pawl being movable with respect to the bar and the at least one rib or notch of the bar.

7. The wireless keyboard device in accordance with claim 6, further comprising:
a bias member biasing the pawl into engagement with the at least one rib or notch of the bar, or the pawl being flexible and resilient, to resist movement of the at least one rib or notch of the bar with respect to the pawl, and thus pivotal movement of the bar with respect to the slot.

8. The wireless keyboard device in accordance with claim 1, wherein the slot is circumscribed by the upper wall of the keyboard panel.

9. A wireless keyboard device configured to carry and wirelessly connect to a computing device including a tablet, or a cellular phone, or both, the wireless keyboard device comprising:
a) a keyboard panel carrying a keyboard with a matrix of alphanumeric keys;
b) an elongated bar pivotally carried by the keyboard panel, the elongated bar being pivotal with respect the keyboard panel;
c) an elongated channel being formed in the elongated bar, the elongated channel configured to receive an edge of the tablet, or the cellular phone, or both;
d) at least one rib or notch on an exterior of the bar and aligned with a longitudinal length of the bar; and
e) a pawl disposed in the keyboard panel and engageable with the at least one rib or notch of the bar to releasably maintain a position of the bar with respect to the keyboard panel, the pawl being movable with respect to the bar and the at least one rib or notch of the bar.

10. The wireless keyboard device in accordance with claim 9, further comprising:
a pair of axles, each disposed on a different end of the bar and aligned with a longitudinal axis of the bar, and aligned to define a pivot axis about which the bar pivots with respect to the keyboard panel.

11. The wireless keyboard device in accordance with claim 9, further comprising:
a bias member biasing the pawl into engagement with the at least one rib or notch of the bar, or the pawl being flexible and resilient, to resist movement of the at least one rib or notch of the bar with respect to the pawl, and thus pivotal movement of the bar with respect to the keyboard panel.

12. The wireless keyboard device in accordance with claim 9, further comprising:
a) a slot formed in and contained within an upper wall of the keyboard panel, the slot having a longitudinal length extending substantially a width of the keyboard panel, the slot having opposite ends closed by the keyboard panel and the upper wall, the slot being fixed with respect to the keyboard panel; and
b) the elongated bar being pivotal within the slot, the elongated bar being aligned with the slot and having a length extending substantially the length of the slot.

13. The wireless keyboard device in accordance with claim 12, wherein the elongated bar extends from the keyboard panel through the slot; and wherein the elongated channel has an opening thereto disposed above the slot and outside of the keyboard panel.

14. The wireless keyboard device in accordance with claim 12, wherein the channel has an opening thereto with an opening width and an interior hollow with an interior width larger than the opening width.

15. The wireless keyboard device in accordance with claim 12, wherein the channel has an interior hollow with an interior width; and further comprising a groove formed in a bottom of the channel having a groove width less than the interior width.

16. The wireless keyboard device in accordance with claim 9, wherein the elongated channel has a pivot axis extending through the channel and aligned with a longitudinal axis of the channel.

17. A wireless keyboard device configured to carry and wirelessly connect to a computing device including a tablet, or a cellular phone, or both, the wireless keyboard device comprising:
a) a keyboard panel with an upper wall and carrying a keyboard with a matrix of alphanumeric keys;
b) a slot formed in and contained within the upper wall of the keyboard panel, the slot having a longitudinal length extending substantially a width of the keyboard panel, the slot having opposite ends closed by the keyboard panel and the upper wall, the slot being fixed with respect to the keyboard panel;
c) an elongated channel pivotally carried by the keyboard panel, the elongated channel being pivotal with respect the slot and the keyboard panel, the elongated channel being aligned with the slot and having a length extending substantially the length of the slot, the elongated channel configured to receive an edge of the tablet, or the cellular phone, or both;
d) at least one rib or notch on an exterior of the channel and aligned with the length of the channel; and
e) a pawl disposed in the keyboard panel and engageable with the at least one rib or notch of the channel to releasably maintain a position of the channel with respect to the slot and the keyboard panel, the pawl being movable with respect to the channel and the at least one rib or notch of the channel.

18. The wireless keyboard device in accordance with claim 17, further comprising:
a bias member biasing the pawl into engagement with the at least one rib or notch of the channel, or the pawl being flexible and resilient, to resist movement of the at least one rib or notch of the channel with respect to the pawl, and thus pivotal movement of the channel with respect to the slot.

19. The wireless keyboard device in accordance with claim 17, further comprising:
at least two buttons disposed on the keyboard panel and associated with different wireless connections between at least two different computing devices.

20. The wireless keyboard device in accordance with claim 17, further comprising:
at least three buttons disposed on the keyboard panel and associated with different wireless connections between at least three different computing devices, including a desktop computer, a tablet computer, and a cellular phone.

* * * * *